United States Patent [19]
Müller et al.

[11] 3,790,290
[45] Feb. 5, 1974

[54] SINGLE MODULATED LIGHT BEAM PHOTOMETER
[75] Inventors: Joachim M. Müller, Pullach; Adolf J. Triller, Munich, both of Germany
[73] Assignee: Erwin Sick Optik-Elektronik, Waldkirch, Germany
[22] Filed: Aug. 3, 1972
[21] Appl. No.: 277,615

[30] Foreign Application Priority Data
Aug. 11, 1971 Germany.................. P 24 40 335.0

[52] U.S. Cl.................... 356/195, 356/88, 356/93, 356/206, 356/212, 356/222, 356/229
[51] Int. Cl....... G01j 3/46, G01n 21/22, G01j 1/10
[58] Field of Search....... 356/88, 89, 93, 94, 95, 96, 356/97, 195, 206, 212, 222, 229; 250/220 R

[56] References Cited
UNITED STATES PATENTS
3,488,122   1/1970   Roussopoulos...................... 356/88

Primary Examiner—John K. Corbin
Assistant Examiner—V. P. McGraw

[57] ABSTRACT

A photometer in which a light beam is split by a mirror into measurement and reference portions, the reference portion of the beam being reflected back through the beam splitting mirror to a photoelectric device. The measurement portion of the beam is reflected back to the beam splitting mirror from which it is reflected to the photoelectric device. The photoelectric device compares intensities of the two received beam portions and provides indication representative of transmission, extinction and remission.

14 Claims, 4 Drawing Figures

SINGLE MODULATED LIGHT BEAM PHOTOMETER

The invention relates to a photometer, in the case of which a light pencil, emitted by a light source, is split up by a beam splitting mirror into a measurement and a reference pencil, which after passing along the measurement and reference paths respectively and reflection at a respective mirror and again passing through and reflection at, respectively, the ray splitting mirror are supplied to a photoelectric device with an associated electronic circuit, which by comparison of the intensities of the measuring and reference pencils provides an indication which is representative for the transmission, extinction or remission.

In the case of exact photometric measurements the problem of compensation of the light source and light receiver to take account of temperature and voltage changes and also ageing often occurs. In order to solve his problem so-called twin beam methods have been proposed in the case of which only one light receiving means is used. This is made possible by the fact that the measurement and reference pencils or beams pass alternately, that is to say with a phase displacement, to the light receiver (see German Pat. specification 1,281,170), or simultaneously, in which case the measurement and reference pencils are modulated with different frequencies (U.S. Pat. specification 1,849,912; German Pat. specification 1,227,688).

The electrical output signals obtained are then separated from each other electronically, following which a quotient is formed. Both methods are used in practice for very precise measurements of physical quantities such as transmission, extinction and remission. However, they involve relatively expensive apparatus so that their use is costly.

Furthermore, a photometer operating with two cells has already been proposed in the case of which an adjustable diaphragm is arranged in front of the comparison or reference cell and which is set via a servomotor so as to be in accordance with the luminous fluxes to be compared. The mechanical setting of the diaphragm is then a measure of the degree of transmission. The disadvantage of this arrangement is, however, that owing to the mechanical regulation the response times are relatively long. Furthermore, the effect on the light pencils or beams reflected and passing through the splitting mirror respectively is not the same.

The aim of the invention is that of creating a photometer of the above-mentioned type which while being technically comparatively simple has a high degree of accuracy and requires a relatively small amount of electronic sircuitry, though the response time is small and an uneven effect on the pencils of light can be avoided.

In order to attain this aim the invention provides in the case of a photometer of the above-mentioned type that the photoelectric device consists of two adjacent photo-electric cells, to which the measurement and reference light pencils pass by a slight tipping of the mirror reflecting the reference pencil. Even if the said two photo-electric cells have a different temperature coefficient which is not neglegible, different temperature and other environmental effects can be substantially avoided, owing to the adjacent arrangement of the said two cells, in accordance with the invention, and a high degree of accuracy is obtained despite the simple arrangement. Since separate signals are present at the two photo-electric cells, no means need be provided for later electronic separation, as is necessary in the case of previously proposed methods.

Preferably a modulation with a single frequency is carried out before the splitting up into the measurement and reference pencils. In accordance with the invention, therefore, only a single modulation frequency is used, which leads to a further substantial simplification of the mechanical and electronic arrangements.

The optical arrangement is preferably such that the source is focussed by a condenser onto chopper wheel or another light chopping device.

Preferably a microobjective, which is arranged behind the chopper, forms the image of the light source filament into the objective located at the beginning of the measurement path and the beam splitting mirror is arranged, advantageously, between the microobjective and the objective.

The reflective mirror is preferably spherical or parabolic so that it concentrates the incident light of the reference beam onto the second photo-electric cell.

A substantial improvement in the temperature behaviour can be ensured if the two photo-electric cells are accommodated in a common housing.

If the light used is modulated, the two output signals of the photo-electric cells are preferably applied jointly via a high pass filter to a variable gain amplifier, the reference signal being additionally passed to it via a rectifier with a low pass filter.

If light modulation is not used, the output signals of the two photo-electric cells can be applied via a low pass filter jointly to a variable gain amplifier, the reference signal being additionally passed through a chopper. In accordance with a further embodiment of the invention the measuring photo-electric cell is connected via a chopper and the reference photo-electric cell is connected directly or via a low pass filter jointly with a variable gain amplifier.

The invention will now be described by way of example with reference to the drawing.

Figure 1:
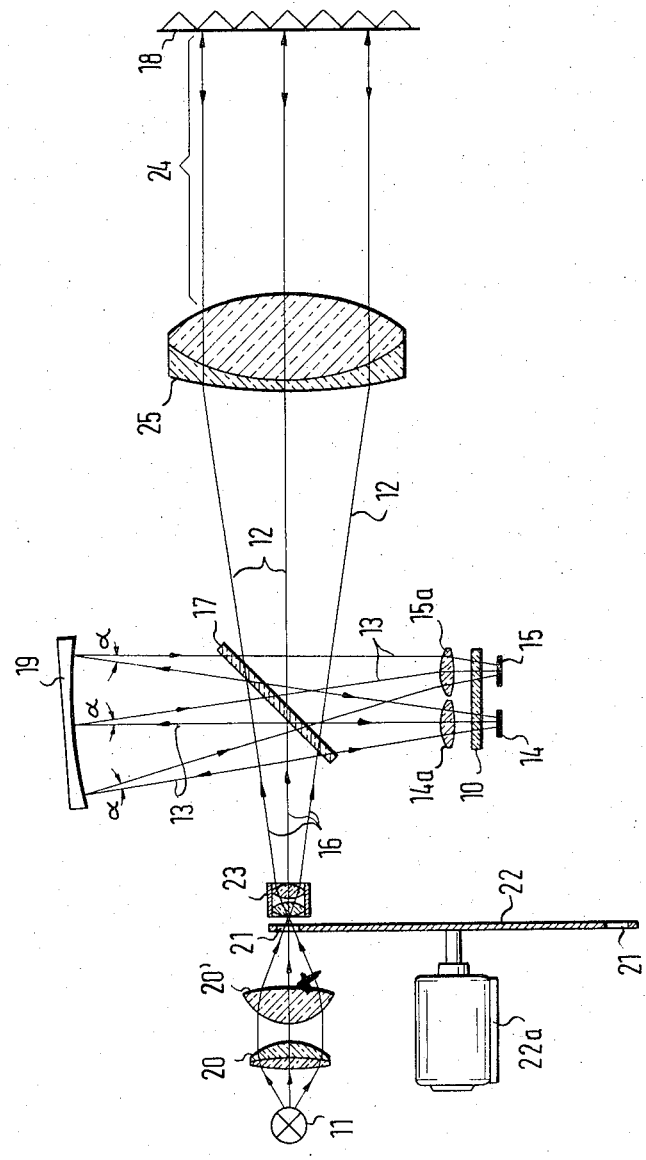
FIG. 1 is a diagrammatic view of the ray path of a photometer constructed in accordance with the invention.

As shown in FIG. 1 the filament 11 of a light source is focussed by a condenser 20, 20' into the holes 21 of a chopper wheel 22 and rotated by a motor 22a. Directly behind the holes 21 a microobjective 23 is provided, which forms the image of the filament in the holes 21 into the objective 25, which is located at the beginning of the measurement path 24. At the end of the measurement path a reflector 18, formed for example by a triple or corner edge reflector, is arranged, which reflects the measurement pencil or beam 12 back along the path it has taken.

Between the microobjective 23 and the objective 25 a beam splitting mirror 17, for example a semi-transparent mirror, is arranged, which reflects part 13 (reference pencil) of the light pencil 16 upwards to a spherical mirror 19.

In accordance with the invention the mirror 19 is so tilted or rocked that the reference pencil 13 is not reflected along the path it has come but is reflected back with a small angular displacement. In this manner it passes now through the splitting mirror 17, which is important, but not to the measurement photo-electric cell 14, but via a converging lens 15a to a reference photo-electric cell 15 arranged adjacent to the latter.

The part of the measuring beam or pencil 12 returning from reflector 18, is also partly reflected on the splitting mirror 17 and passes via a converging lens 14a to a measuring photo-electric cell 14.

In accordance with the invention the converging lenses 14a, 15a are arranged adjacent to each other and the photo-electric cells 14, 15 have a correction filter 10 arranged between them.

In this manner the measurement and reference pencils pass through the splitting mirror 17 once and are reflected once by it. The effect on the pencil of the splitting mirror is thus the same.

The mirror 19 has such a focal length that the light incident on it is focussed on the converging lens 15a and thus on the photo-electric cell 15.

Figure 2:
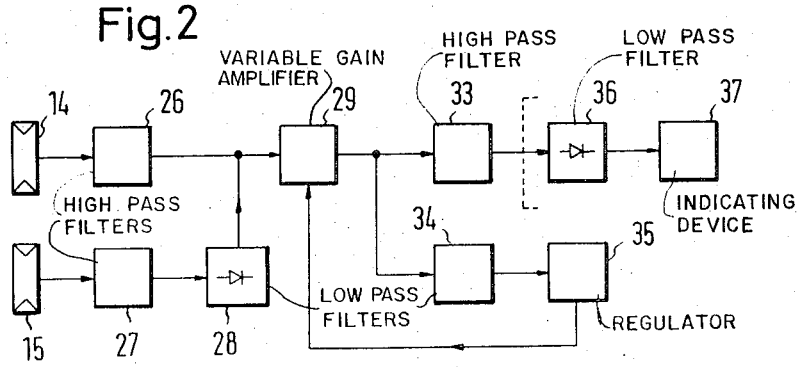
FIG. 2 is a block circuit diagram of a signal processing circuit in the case of the use of modulated light.

The electrical signals occurring at the outputs of the photo-electric cells 14, 15 can in accordance with the invention be processed in a circuit in accordance with FIG. 2 for instance. In accordance with the modulation frequency, amounting for example to 4 kHz, modulated measurement and reference signals occur at the outputs of the two photo-electric cells 14, 15 with the same frequency and in phase. In order to eliminate DC and low frequency components in the signals the latter are supplied firstly to high pass filters 26, 27 with a threshold frequency of approximately 1 kHz. Following this the reference signal is rectified and filtered in a low pass filter 28 with a threshold frequency of 10 Hz. The filtered measurement signal is then fed jointly with the demodulated reference signal to a variable gain amplifier 29 and following this separated again with a 1 kHz high pass filter 33 and a 10 Hz low pass filter 34. A regulator 35 to which a target value signal is fed compares the reference signal with a constant reference voltage and regulates the variable gain amplifier until the signals are the same. The measurement signal is then demodulated and filtered in a low pass filter 36. It is now available for further processing in an indicating device 37.

This type of indirect formation of the quotient is superior to direct quotient formation as regards complexity and accuracy.

The substantially new inventive principle of the processing circuit resides in that the measurement and reference signals, after they have been freed of spurious components by high pass filters, are fed to a common controlled amplifier 29, following which the two signals are separated again and the gain of the variable gain amplifier is so set that the reference signal always remains constant at the same value. Since, however, initially the two signals have the same frequency and accordingly it is not readily possible to separate them again once they have been mixed, the reference signal is first converted into a DC signal, which is mixed in a variable gain amplifier with a 4 kHz measuring signal and only separated with a high pass and a low pass filter again.

Although the above-described processing circuit operating with modulated light is preferred, in simpler cases it is also possible to use non-modulated light, if for example ambient light cannot reach the apparatus.

Figure 3:
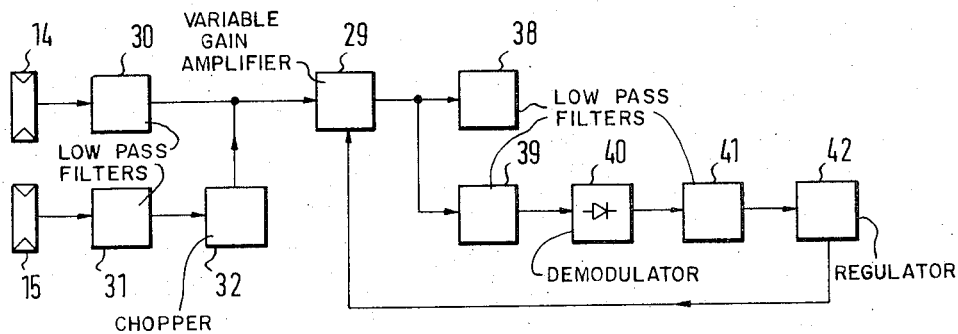
FIG. 3 is a block circuit diagram of a signal processing circuit in the case of the use of non-modulated light.

In this case as well the same processing principle can be used, for example in accordance with the circuit of FIG. 3. The photo-electric cells 14, 15 are connected with low pass filters 30, 31 for filtering out the 100 Hz noise. The reference signal is then passed additionally through a chopper with a frequency of for example 1 kHz and is then supplied to the variable gain amplifier 29.

Following the variable gain amplifier 29, as shown, a low pass filter 39, a high pass filter 39, a demodulator 40, a further low pass filter 41 and a regulator 42 are arranged. which supplies the control signal for the variable gain amplifier 29.

The circuit in accordance with FIG. 3 is particularly suitable for slowly changing measurement signals. The lamp 11 does not need to be stabilised in this case.

Figure 4:
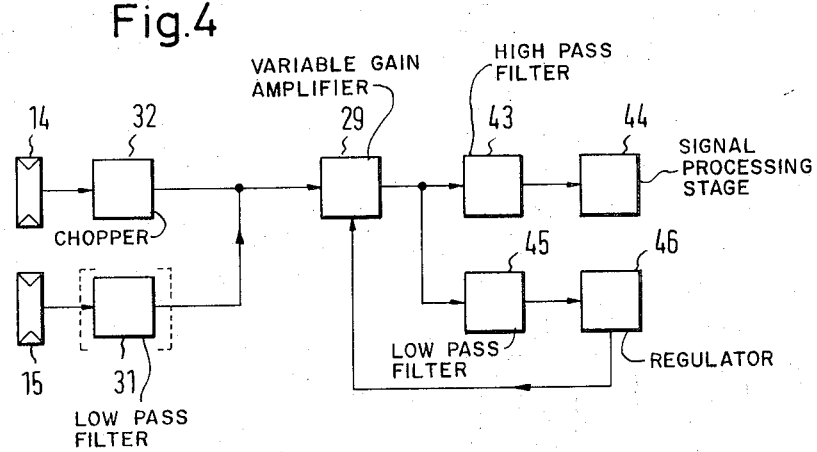
FIG. 4 shows a further block circuit diagram of an signal processing circuit in the case of the use of non-modulated light.

The circuit in accordance with FIG. 4 also operating with unmodulated light is particularly suitable for rapidly changing measurement signals. In this case the lamp is stabilised in accordance with the invention, for which reason the low pass filter 31 for the reference signal does not necessarily have to be employed. The frequency of the chopper 32 which receives the measurement signal should be as high as possible.

Following the variable gain amplifier 29 there are, in accordance with the drawing, a high pass filter 43, a signal processing stage 44, a low pass filter 45 and a regulator 46, which supplies the control signal for the variable gain amplifier 29.

We claim:

1. A photometer, in the case of which a light pencil, emitted by a light source, is split up by a beam splitting mirror into a measurement and a reference pencil, which after passing along the measurement and reference paths respectively and reflection at a respective mirror and again passing through and reflection at, respectively, the ray splitting mirror are supplied to a photo-electric device with an associated electronic circuit, which by comparison of the intensities of the measuring and reference pencils provides an indication which is representative for the transmission, extinction or remission, characterized in that the photoelectric device consists of two adjacent photo-electric cells, to which the measurement and reference light pencils, respectively, pass by a slight tipping of the mirror reflecting the reference pencil.

2. A photometer in accordance with claim 1, characterized in that a modulation is carried out by a chopper with a single frequency before splitting up into the measurement and reference light pencils.

3. A photometer in accordance with claim 2, characterized in that the light source is focussed or projected by a condensor onto the holes of a chopper wheel which accomplishes the frequency modulations.

4. A photometer in accordance with claim 3, characterized in that the frequency of modulation amounts to 4 kHz.

5. A photometer in accordance with claim 3, characterized in that a microobjective, arranged behind the chopper wheel, projects the image of the filament of the source of light into the objective located at the beginning of the measurement path, and the splitting mirror is arranged between the microobjective and the objective.

6. A photometer in accordance with claim 5 characterized in that the measuring path is located in an extension of the optical axis of the light source ray path.

7. A photometer in accordance with claim 6, characterized in that the reflecting mirror which reflects the reference pencil and the photoelectric cells are arranged transversely with respect to the principal ray path.

8. A photometer in accordance with claim 7 characterized in that the reflecting mirror is spherical or parabolic so that it concentrates the instant light of the reference beam onto the second photoelectric cell.

9. A photometer in accordance with claim 1 characterized in that the two adjacent photo-electric cells are accommodated in a common housing.

10. A photometer in accordance with claim 1 characterized in that the electronic circuit includes means connecting the output measurement signal from one of said photo-electric cells to the input side of a high pass filter and the output side of said high pass filter to the input side of a variable gain amplifier and further includes means connecting the output reference signal from the other of said photo-electric cells to the input side of a high pass filter and means connecting the output side of said last named high pass filter with the input side of a rectifier and low pass filter and means connecting the output from the latter with the input side of said variable gain amplifier.

11. A photometer in accordance with claim 1 using unmodulated light, characterized in that the electronic circuit includes means connecting the output measurement signal from one of said photo-electric cells to the input side of a low pass filter and the output side of said low pass filter to the input side of a variable gain amplifier and further includes means connecting the output reference signal from the other of said photo-electric cells to the input side of a low pass filter and means connecting the output side of said last named low pass filter with the input side of said variable gain amplifier via a chopper.

12. A photometer in accordance with claim 1 characterized in that the measurement photoelectric cell is connected via a chopper and the reference photoelectric cell via a low pass filter with a variable gain amplifier.

13. A photometer in accordance with claim 1 characterized in that in front of each photoelectric cell a converging lens is arranged which combines the light concentrated on them in the associated photo-electric cells.

14. A photometer in accordance with claim 1 characterized in that directly in front of the photo-electric cells a correction filter is arranged to eliminate undesired frequencies.

* * * * *